US009623701B2

(12) United States Patent
Longino et al.

(10) Patent No.: US 9,623,701 B2
(45) Date of Patent: Apr. 18, 2017

(54) SKATEBOARD WITH REMOVABLE HUB

(71) Applicant: Rim Ryderz, LLC, Montebello, CA (US)

(72) Inventors: Tyrone Longino, Montebello, CA (US); Josh Morrison, Fallbrook, CA (US); Dorian Maurice Leniar, San Diego, CA (US); Howard Edward Ouellette, Hawthorne, CA (US)

(73) Assignee: Rim Ryderz, LLC, Montebello, CA (US)

( * ) Notice: Subject to any disclaimer, the term of this patent is extended or adjusted under 35 U.S.C. 154(b) by 0 days.

(21) Appl. No.: 14/996,168

(22) Filed: Jan. 14, 2016

(65) Prior Publication Data

US 2016/0263936 A1   Sep. 15, 2016

Related U.S. Application Data

(60) Provisional application No. 62/103,741, filed on Jan. 15, 2015.

(51) Int. Cl.
| | |
|---|---|
| *B60B 7/01* | (2006.01) |
| *A63C 17/22* | (2006.01) |
| *B60B 7/00* | (2006.01) |
| *A63C 17/00* | (2006.01) |
| *A63C 17/01* | (2006.01) |
| *B60B 7/06* | (2006.01) |

(52) U.S. Cl.
CPC .......... *B60B 7/0013* (2013.01); *A63C 17/002* (2013.01); *A63C 17/012* (2013.01); *A63C 17/015* (2013.01); *B60B 7/063* (2013.01)

(58) Field of Classification Search
CPC ......... B60B 7/0013; B60B 7/002; B60B 7/06; B60B 7/061; B60B 7/063; B60B 7/08; A63C 17/002; A63C 17/012; A63C 17/015; A63C 17/02
USPC ......... 280/87.021, 87.042; 301/5.301, 5.305, 301/5.306, 5.309
See application file for complete search history.

(56) References Cited

U.S. PATENT DOCUMENTS

| | | | | |
|---|---|---|---|---|
| 6,454,361 | B1 * | 9/2002 | Martin | A63C 17/22 301/37.22 |
| 7,210,747 | B1 * | 5/2007 | Spillman | A63C 17/26 301/37.25 |
| 7,905,641 | B2 * | 3/2011 | Peckham, Jr. | A63C 17/22 280/11.203 |
| 2004/0108768 | A1 * | 6/2004 | Weiss | A63C 17/22 301/5.301 |
| 2007/0241607 | A1 * | 10/2007 | Hildebrand | A63C 17/22 301/5.301 |

* cited by examiner

*Primary Examiner* — John Walters
(74) *Attorney, Agent, or Firm* — Lewis Brisbois Bisgaard & Smith LLP; Jon Hokanson (57) ABSTRACT

A skateboard with a removable hub that can be attached and detached from a wheel of a skateboard, comprising a skateboard deck rollably supported by one or more wheels and attached to the wheels via one or more trucks, with each hub removably attached to the wheel with a key.

1 Claim, 9 Drawing Sheets

SKATEBOARD WITH REMOVABLE HUB

FIELD OF INVENTION

The invention relates generally to hubs, and more specifically to hubs used for skateboards.

BACKGROUND

Skateboards are often used as a means of transportation and/or athletic performance. Riders of skateboards oftentimes like to distinguish themselves by affixing colorful and/or unique hubs to the wheels of their skateboards. However, currently there is no known effective and/or efficient way of attaching or detaching hubs from skateboards. Thus, it is desirable to have a convenient system and method that enables attachment and/or detachment of hubs to/from the wheels of skateboards.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present invention relates to hubs or wheel covers that cover the central portion or the entire face of a wheel, of for example, a skateboard. Hubs may function to reduce the accumulation of dirt and moisture inside a wheel. Hubs may also function to make a wheel more visually appealing by decorating the exterior of a wheel with various shapes and colors. Hubs can be used with numerous types of wheel-based devices or vehicles including, but not limited to, skateboards, roller skates, roller blades, tricycles, carts and the like.

These and other aspects, embodiments, features, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the figures to indicate certain components, aspects or features shown therein. Reference symbols common to more than one figure indicate like components, aspects or features shown therein.

DETAILED DESCRIPTION

The subject matter of aspects of embodiments of the present invention is described with specificity herein to meet statutory requirements. However, the description itself is not intended to limit the scope of any patent issuing from this description. Rather, the inventors have contemplated that the claimed subject matter might also be embodied in other ways, to include different elements or combinations of elements similar to the ones described in this document, in conjunction with other present or future technologies.

Figure 1:
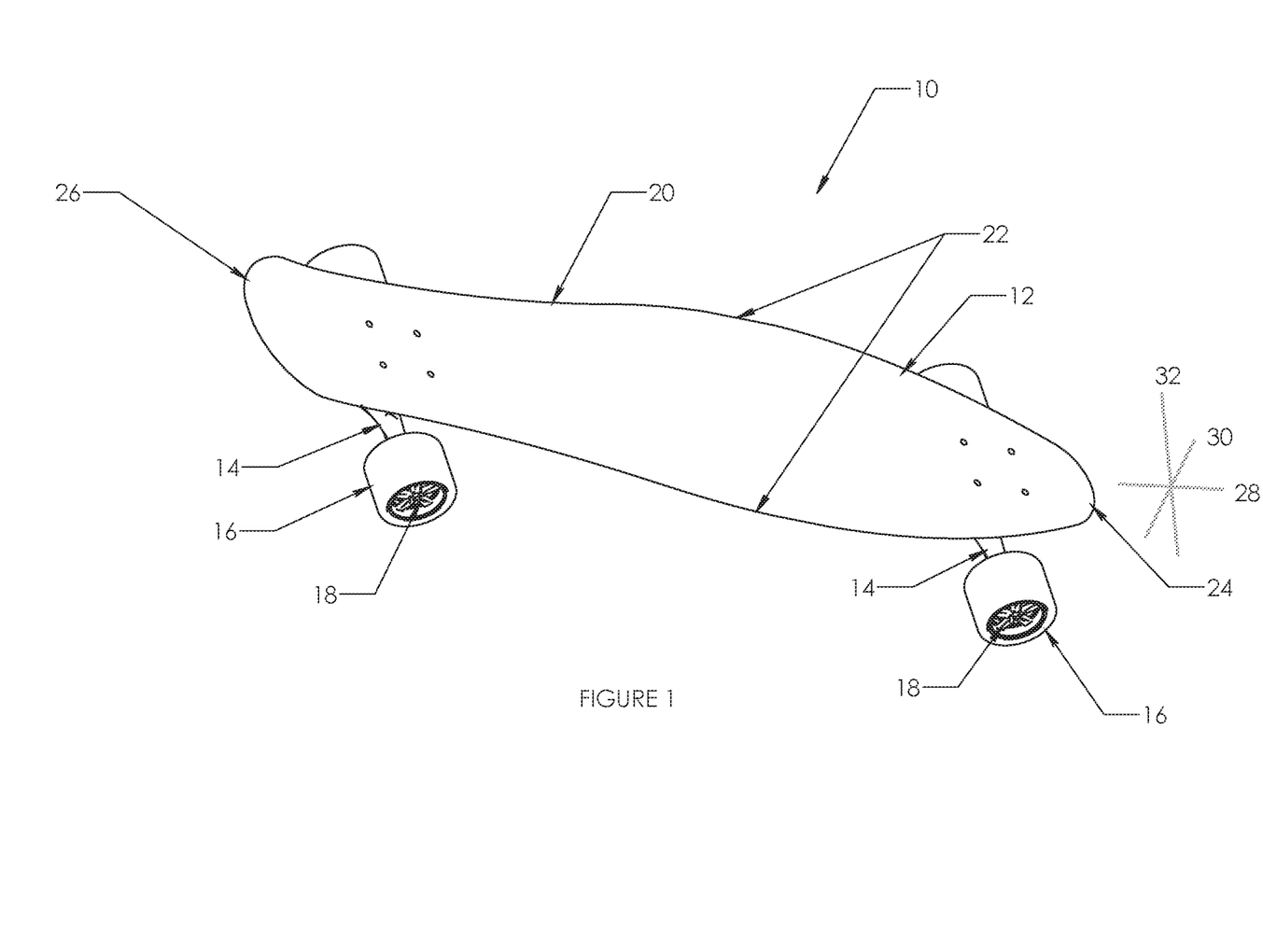
FIG. 1 is a side elevation view of an exemplary skateboard in accordance with aspects of the present invention.

With reference now to the drawings, and in particular to FIG. 1 which is a schematic illustration of an exemplary skateboard 10, in accordance with the present invention. Skateboard 10 comprises a deck 12, trucks 14 (only partially shown), wheels 16 (only two of four are shown), and hubs 18 (only two of four are shown). The exemplary skateboard 10 shown in FIG. 1 is a longboard. However, the present disclosure also contemplates other types and sizes of skateboards including, but are not limited to, short skateboard, snakeboard (or street board), electric skateboard, slalom board and the like.

Deck 12 is a plank or platform sized and configured for supporting a person in a standing or crouching position. Deck 12 is rollably supported by one or more sets of wheels 16 from beneath. Deck 12 has a longitudinal axis 28, latitudinal axis 30, elevation axis 32, distal edge 26, proximate edge 24, and width 22 at its widest on latitudinal axis 30. The exemplary skateboard 10 has a generally elliptical upper surface 20 with curved sides. Alternatively, the shape of the upper surface 20 of deck 12 may be one or a combination of shapes including, but are not limited to, rectangular, elliptical, and/or circular. Exemplary skateboard 10 has a relatively smooth upper surface 20 throughout with a veneer having a sandpaper quality in order to improve grip. Alternatively, upper surface 20 may be more rugged with indentations in which the rider's feet may be positioned. Deck 12 may be constructed from one or more materials including, but are not limited to, wood, plastic, ceramic, and/or metal.

Figure 2:
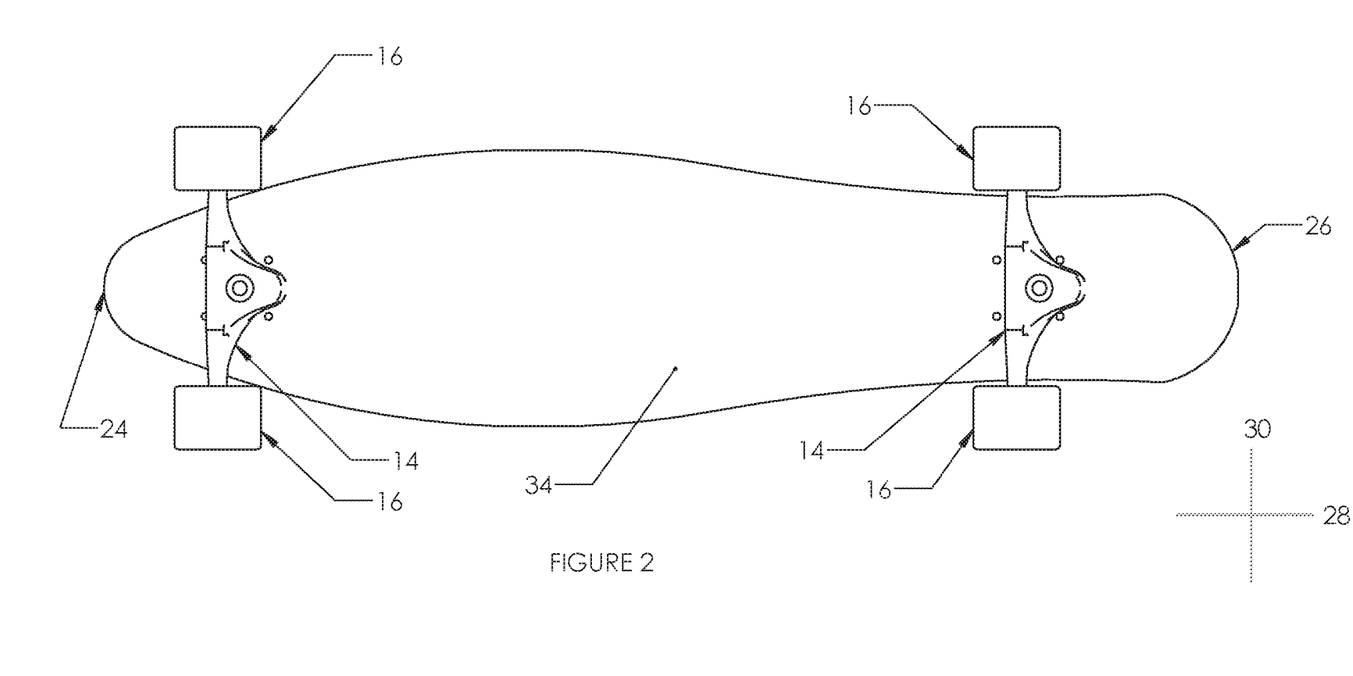
FIG. 2 is a bottom plan view of the skateboard of FIG. 1.

Turning now to FIG. 2 which is a schematic illustration of a bottom plan view of the same skateboard 10 from FIG. 1. Exemplary skateboard 10 has two trucks 14 disposed along the longitudinal axis 28 on the underside surface 34 of deck 12. A first truck 14 is located near the proximate edge 24 and a second truck 14 is located near distal edge 26. Each truck 14 functions to hold wheels 16 to underside surface 34 of deck 12. When in use, various conventional or novel trucks 14 may be engineered in such a way as to allow limited pivoting about the elevation 32, latitudinal 30, and/or longitudinal 28 axes. In the exemplary embodiment, two wheels 16 are attached to each truck 14. In another embodiment, fewer than or more than two wheels 16 are attached to each truck 14. In yet another embodiment, each truck 14 is attached to a different number of wheels 16. Truck 14 is preferably constructed from a rigid, weight bearing material such as steel. Alternative embodiments of truck 14 may be constructed from one or more materials including, but are not limited to, plastic, ceramic, and/or other metals.

Figure 3:
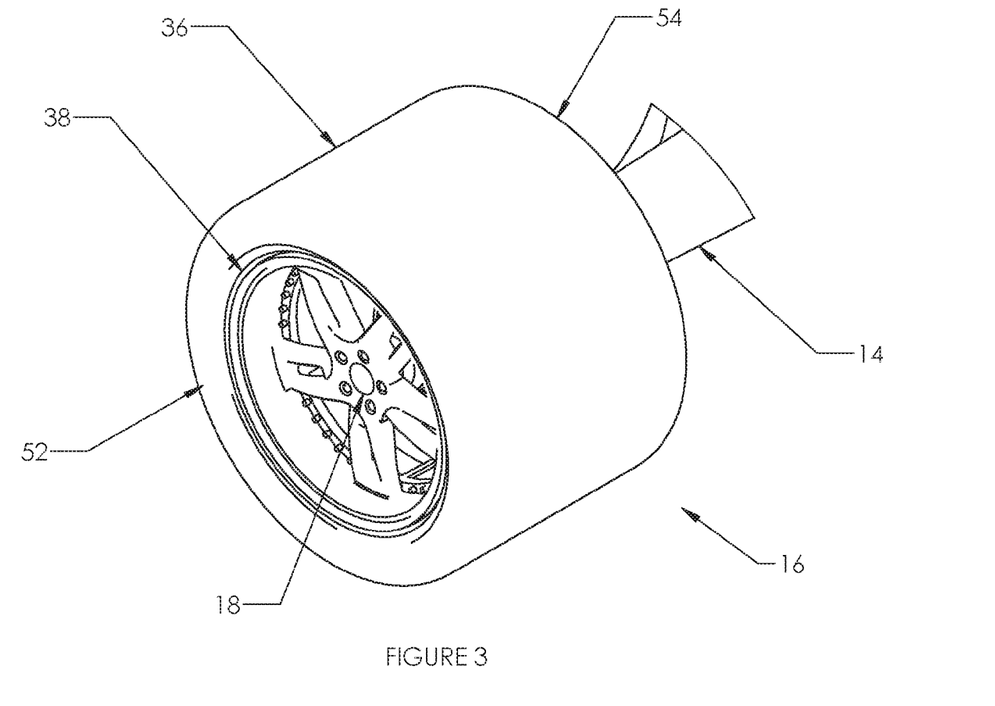
FIG. 3 is side elevation view of one of the wheels of the skateboard shown in FIG. 1.
Figure 4:
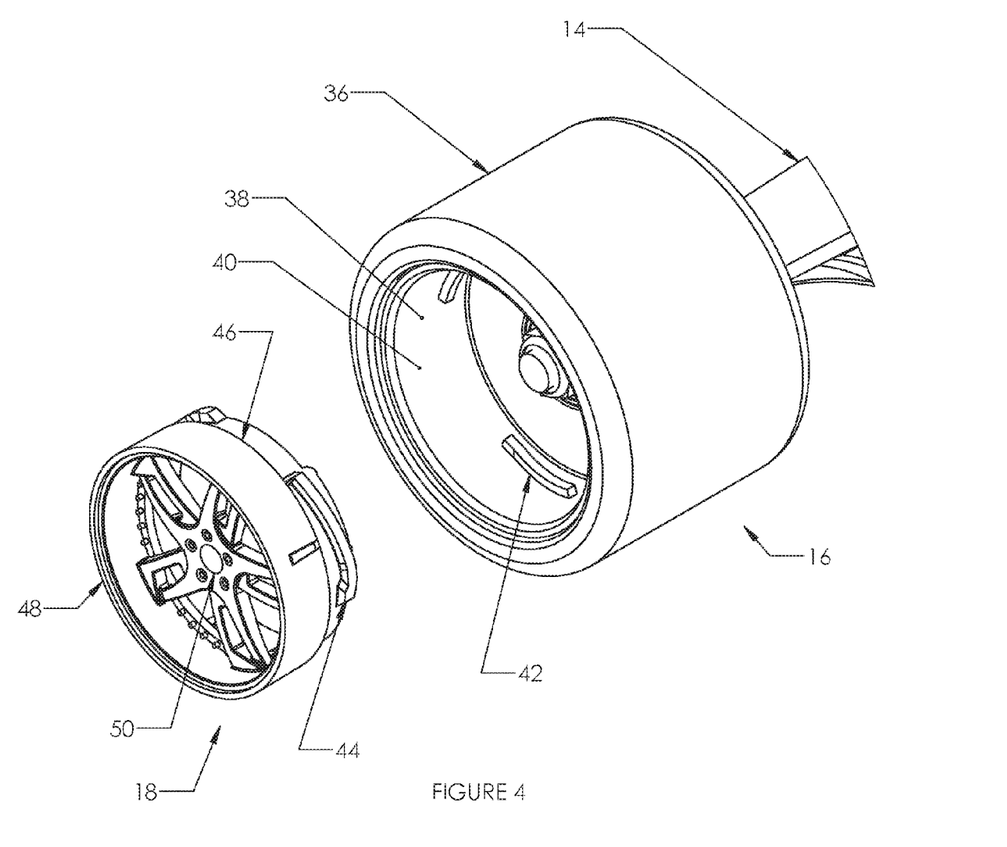
FIG. 4 is an exploded view of the FIG. 3 wheel.

With reference to FIGS. 3 and 4, each of the wheels 16 is rotatably attached to truck 14, and includes tire 36, core 38 and hub 18. One end of truck 14 (partially shown) is attached to wheel 16 and another end of truck 14 is attached to the underside surface 34 of deck 12 (not shown). In the exemplary embodiment, truck 14 is preferably bolted to wheel 16 and to the underside surface 34 of deck 12. Alternatively, truck 14 may be fixedly attached to wheel 16 and/or the underside surface 34 of deck 12 by one or more fastening means including, but not limited to, bolts, screws, latches, and/or welding. Alternatively, truck 14 may be removably attached to wheel 16 and/or the underside surface 34 of deck 12 by one or more fastening means including, but not limited to, snap lock and/or thread lock.

Figure 5:
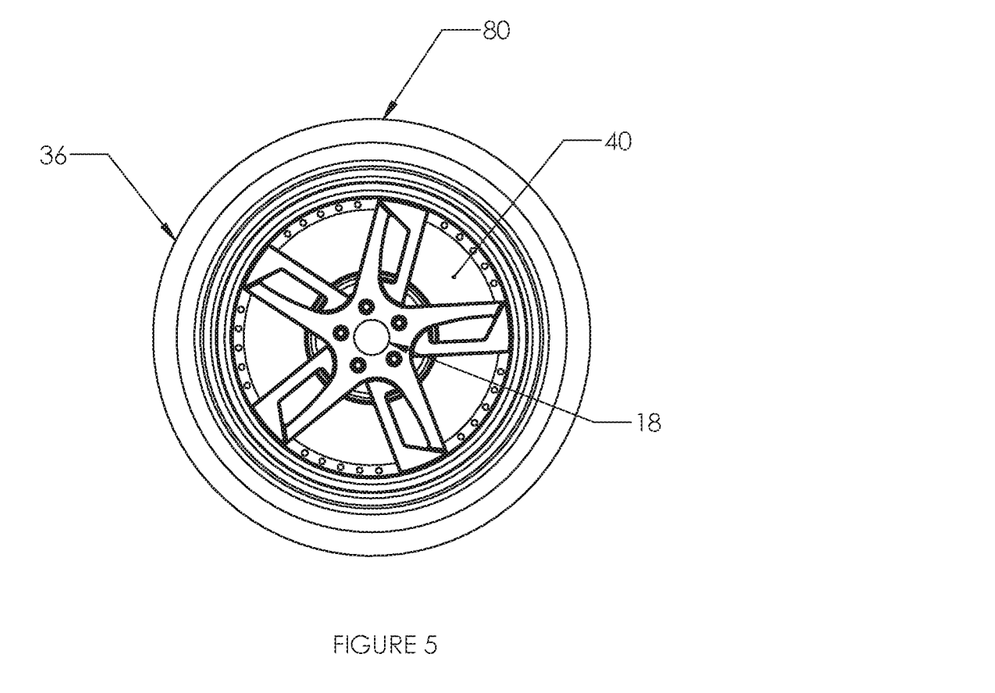
FIG. 5 is a side view of the FIG. 3 wheel.

With reference to FIGS. 4-5, core 38 has a cavity 40 and receiving portion 42. Hub 18 has locking portions 44 separated by gaps as shown in FIG. 4, proximate edge 48, distal edge 46, and spokes 50. Core 38 functions to hold tire 36 to hub 18. In the exemplary embodiment of FIGS. 4-5, hub 18 is removably attached to core 38. Alternatively, hub 18 may be fixedly attached to core 38. Alternatively, locking portions 44 may be of a continuous structure, that is, without any gaps between the locking portions. In the FIGS. 4-5 exemplary embodiment, core 38 is fixedly disposed in cavity 40 of tire 36 by means of a combination of mechanical and chemical adhesion. Core 38 may be fixedly disposed or ensconced in cavity 40 of tire 36 by one or more fastening means including, but not limited to, bolt, screw, latches, and/or welding. Alternatively, core 38 may be removably disposed in cavity 40 of tire 36 by one or more fastening means including, but not limited to, snap lock, thread lock, and/or friction in general. Tire 36 may be constructed from one or more materials including, but not limited to, plastic and/or rubber. In the exemplary embodiment, tire 36 is preferably constructed from thermal plastic urethane elastomer and having a diameter of preferably about 2.9 inches (7.4 centimeters). In alternative embodiments of the present invention, the diameter of tire 36 may be greater than or less than 2.9 inches. In the exemplary embodiment, the diameter of core 38 is preferably about 2.28 inches (5.8 centimeters). In alternative embodiments of the present invention, the diameter of core 38 may be greater than or less than 5.8 inches. Core 38 may be constructed from one or more materials including, but not limited to, plastic, wood, rubber, and/or metal. Hub 18 may be constructed from one or more materials including, but not limited to, plastic and/or metal. In the exemplary embodiment, core 38 is constructed from thermal plastic urethane and hub 18 is constructed from thermal plastic urethane. In the exemplary embodiment, the diameter of the hub 18 may be preferably about 2.05 inches (5.2 centimeters). In alternative embodiments of the present invention, the diameters of hub 18 may be greater than or less than 2.05 inches. Although the exemplary embodiment describes wheel 16 and hub 18 as being used in conjunction with skateboard 10, the present invention also contemplates using wheel 16 and hub 18 in conjunction with other forms of wheel-based devices including, but not limited to, roller blades, roller skates, toy cars, tricycles and the like.

Referring to FIG. 4, the exemplary embodiment is showing hub 18 configured to be removably attached to core 38 by means of a snap lock mechanism comprising receiving portion 42 and locking portion 44. Receiving portion 42 of the snap lock mechanism is disposed inside cavity 40 of core 38. Locking portion 44 of the snap lock mechanism is disposed near or on distal edge 46 of hub 18. In operation, hub 18 is inserted into cavity 40 of core 38 with distal edge 46 facing towards core 38 such that locking portion 44 aligns with receiving portion 42. The user then rotates the hub 18 thereby causing the locking portion 44 to engage with receiving portion 42. After hub 18 is locked into core 38, hub 18 is fixed in place. In alternative embodiments, while distal portion 46 is firmly attached to core 38, proximate edge 48 may be free to rotate independently of distal edge 46, core 38, or tire 36. In the exemplary embodiment, once hub 18 is locked inside cavity 40, proximate edge 48 of hub 18 is flush with distal edge 52 (see FIG. 3) of core 38. Alternatively, proximate edge 48 may extend beyond distal edge 52. In yet other embodiments, proximate edge 48 does not reach distal edge 52 and remains situated between distal edge 52 and proximate edge 54 (see FIG. 3) of core 38.

Figure 6:
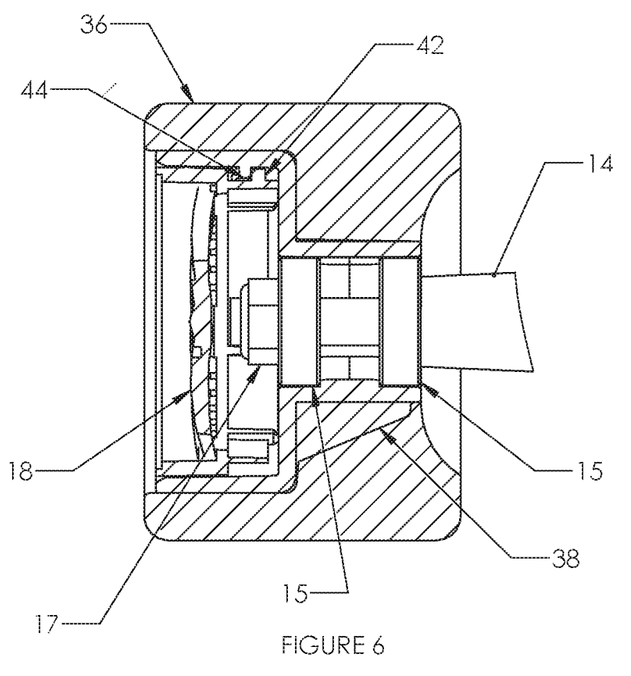
FIG. 6 is a cross-sectional view of the FIG. 3 wheel.

Referring to FIG. 6, truck 14 is shown having bearings 15, 15 to permit rotation of the wheel 16, which is held on to the truck 14 with nut 17.

Figure 7:
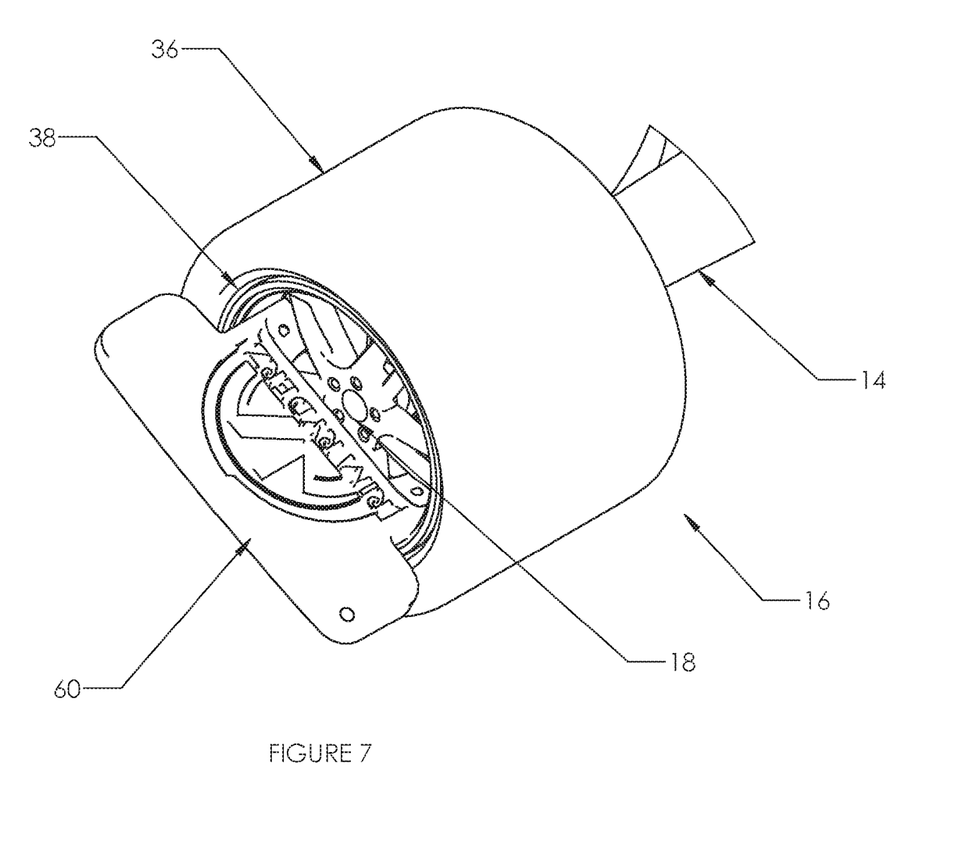
FIG. 7 is a side elevation view of the FIG. 3 wheel with a key inserted into a key lock.

Turning now to FIG. 7 which is a schematic diagram of wheel 16 as depicted in FIG. 3 but with the addition of a key 60 which is inserted into hub 18. Key 60 functions to attach hub 18 to or detach hub 18 from core 38.

Figure 8:
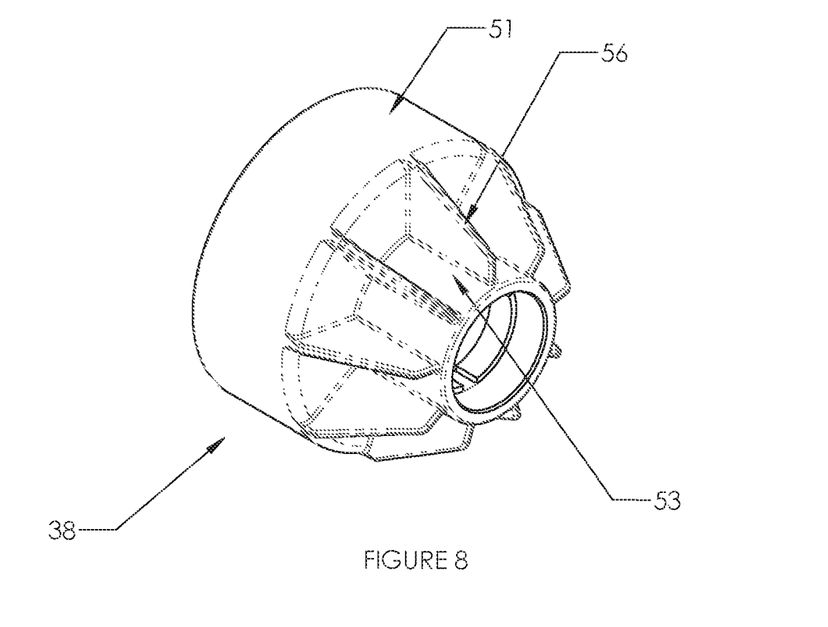
FIG. 8 is a close-up perspective view of the core of the FIG. 3 wheel.

FIG. 8 is a schematic diagram of a perspective view of core 38 from FIGS. 3-4. FIG. 3 shows core 38 disposed within cavity 40 of tire 36. The exemplary embodiment in FIG. 3 shows a core 38 fixedly coupled to tire 36 within cavity 40. Alternatively, core 38 may be removably coupled to tire 36 within cavity 40. In FIG. 3, core 38 is oriented within cavity 40 of tire 36 such that proximate edge 54 is nearest to truck 14 and distal edge 52 is farthest from truck 14. With reference to FIG. 8, core 38 in the exemplary embodiment comprises two adjacent cylinders 51 and 53, each having a different diameter. In alternative embodiments, cylinders 51 and 53 may be another shape including, but are not limited to, cube, conical, and pyramidal. The diameter of cylinder 51 is preferably about 2.3 inches (5.8 centimeters) and the diameter of cylinder 53 is preferably about 1 inch (2.7 centimeters). In alternative embodiments, cylinders 51 and 53 may have diameters that vary. In alternative embodiments, cylinders 51 and 53 may have the same diameter thereby forming one continuous cylinder.

Continuing with FIG. 8, cylinder 53 has multiple fins 56 disposed on its exterior. Each fin 56 has five edges, namely: (1) parallel and adjacent to the outer wall of cylinder 53, spanning the approximate length of cylinder 53; (2) perpendicular to the outer wall of cylinder 53 and along the proximate flat end of cylinder 51, spanning the difference between the radius of cylinder 51 and that of cylinder 53; (3) a relatively short edge extending straight from the outer wall of cylinder 51 toward the proximate end of cylinder 53; (4) an angled edge sloping from the relative short edge to about the proximate end of cylinder 53, and (5) an edge perpendicular to outer wall of cylinder 53. The fins 56 are shaped and structured to distribute the weight exerted by a rider evenly over the structure of core 38 and increase bonding area of tire 36. In alternative embodiments, fins 56 may be one or more shapes so long as they function to distribute the user's weight over the surface area of core 38. Fins 56 are sized to fit core 38 within cavity 40 of tire 36 such that the fit is snug enough to allow core 38 to remain in position during normal use. In the exemplary embodiment, core 38 is fixedly disposed within cavity 40 of tire 36 by means of combination of mechanical and chemical adhesion. In alternative embodiments, core 38 is permanently coupled to cavity 40 of tire 36 by one or more fastening means including, but are limited to, adhesive, screws, snap-fit, and the like. In other alternative embodiments, core 38 is removably coupled to cavity 40 of tire 36 by a friction fit. Alternatively still, some embodiments may not have fins 56, but instead a cylinder 53 that tapers in thickness and performs the same function as the fins 56 in creating a snug fit between core 38 and tire 36.

Figure 9:
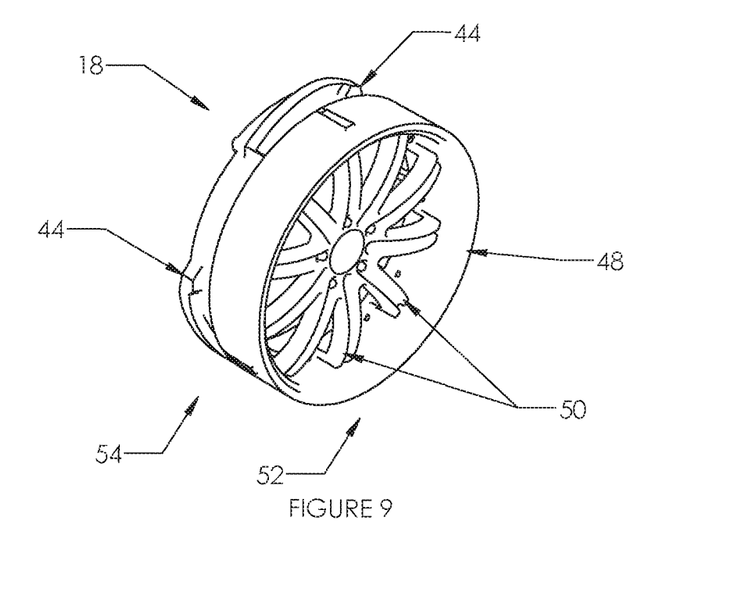
FIG. 9 is a side elevation view of an exemplary hub that may be used with the FIG. 1 skateboard.
Figure 10:
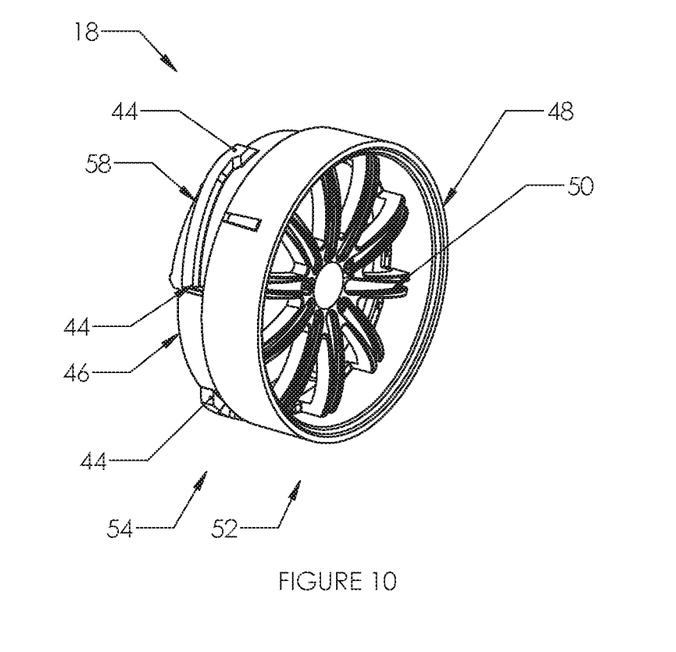
FIG. 10 is a side elevation view of an alternate exemplary hub that may be used with the FIG. 1 skateboard; and, FIG. 11 is a perspective view of the key shown in FIG. 7.

Turning now to FIGS. 9 and 10 which are schematic diagrams of two exemplary hubs 18. Hubs 18 may function to screen out dirt and moisture thereby maintaining cleanliness and combating rust formation inside the wheel. The exemplary hubs 18 exhibit monochromatic color schemes. Alternative hubs 18 may exhibit a variety of colors schemes and structural adornments thereby distinguishing skateboards 10, and hence their riders, from other skateboards.

With respect to the embodiment hub of FIG. 9 and the alternate embodiment hub of FIG. 10, both embodiments comprise two adjacent cylinders 52 and 54. In the FIG. 9 embodiment, however, the cylinder 54 comprises two or more sections, that is, partial cylinders or cylinder sections, with gaps between the sections. In the FIG. 10 embodiment, the cylinder 54 is continuous, and provides for increased support for the cylinder. The continuous cylinder embodiment of FIG. 10 is preferable because it is less flexible, and, during use provides greater resistance to flexing than does the multi-section cylinder of FIG. 9. As will be appreciated by those skilled in this field, the FIG. 10 embodiment can accommodate greater weight without flexing to the point where the hub would be ejected during use. The diameter of cylinder 52 is preferably about 2.1 inches (5.2 centimeters). In alternative embodiments, the diameter of unitary cylinder 52 or the sectioned cylinder 52 may be more or less than 2.1 inches. The diameter of cylinder 54 is preferable about 1.9 inches (4.8 centimeters). In alternative embodiments, the diameter of cylinder 54 may be more or less than 1.9 inches. In alternative embodiments, the curved contour of hub 18 may be another shape besides cylindrical including, but are not limited to, cuboidal, conical, and/or spherical. In the exemplary embodiment, locking portion 44 is disposed on cylinder 54 of hub 18 and functions to engage with the receiving portion 42 of core 38 (see FIG. 4). Locking portion 44 comprises a raised surface that runs diagonally across the surface of the curved side of cylinder 54. Preferably, there are three locking portions 44 positioned around the circumference of cylinder 54. Alternative embodiments may have more or fewer than three locking portions 44 positioned around the circumference of cylinder 54. In addition, alternative embodiments may have locking portions 44 that have one or more different shapes and/or sizes. For instance, an alternative locking portion 44 may be a spherical protuberance or a small dent instead of a line of raised surface. In the exemplary embodiment, the circumferential perimeter of cylinder 54 along the distal edge 46 comprises three raised panels 56 that overlap with the aforementioned three locking portions 44. Alternative embodiments of hub 18 may not have raised panels 56. Other embodiments of hub 18 may have raised panels 56 in a different shape and/or size.

In the FIG. 9 embodiment, exemplary hub 18 comprises cylinder 52 and a partial cylinder 54. Partial cylinder 54 comprises three individual curved panels 58 spaced apart around the circumferential perimeter of the distal edge 46 of cylinder 52. A locking portion 44 is disposed on each of the curved panels 58. Each locking portion 44 runs diagonally across its respective curved panel 58 and extends beyond the perimeter of the curved panel 58.

The exemplary embodiments in FIGS. 9 and 10 show snap lock mechanisms for securing hub 18 to core 38. Alternatively, hub 18 may be removably attached to core 38 by one or more other fastening means including, but are not limited to, thread lock, magnetic, friction, and/or push rod.

In each of the exemplary embodiments shown in FIGS. 9 and 10, ten spokes 50 are disposed on each hub 18, between distal edge 46 and proximate edge 48. In alternative embodiments, there may be more than or fewer than ten spokes 50 disposed on each hub 18 and may be located closer toward proximate edge 48 or distal edge 46. In other embodiments, one or more spokes 50 in hub 18 may be shaped differently compared to the other spokes 50 in the same hub 18 and may be located at different distances from proximate edge 48 or distal edge 46.

Figure 11:
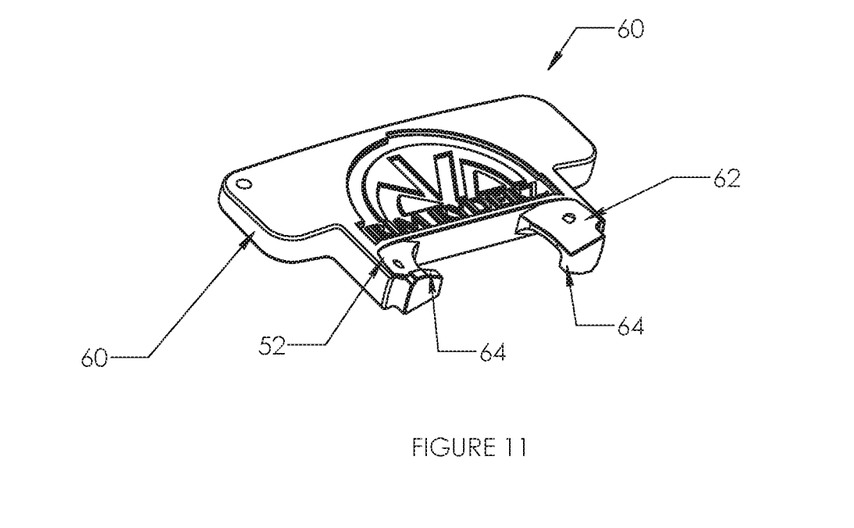

Turning to FIG. 11, which is a schematic diagram of the key 60 as shown in FIG. 7. Exemplary key 60 is constructed from thermal plastic urethane. Alternative embodiments of key 60 may be constructed from one or more materials including, but not limited to, plastic, ceramic, and/or metal. The exemplary key 60 has two arms 62, wherein a hook 64 is disposed on one end of each arm 62. In alternative embodiments, key 60 may have one arm 62 or more than two arms 62. In other embodiments, two or more hooks 64 are disposed on each arm 62. In the exemplary embodiment, arms 62 are oriented in opposite directions such that one hook 64 is facing upward and the other hook 64 is facing downward (this orientation improves the process of attaching and/or detaching hub 18 from core 38, as described in more detail below). In alternative embodiments, arms 62 may be oriented in the same direction such that both hooks 64 are facing the same direction. In other embodiments, arms 62 may be angled with respect to the body 66 of key 60 such that hooks 64 are facing a direction that also forms an angle with respect to the surface of the flat body 66 of key 60. The exemplary embodiment shows hook 64 perpendicularly oriented with respect to attached arm 62. In alternative embodiments, hook 64 may form an acute or obtuse angle with respect to attached arm 62.

In operation, arms 62 of key 60 are inserted between spokes 50 of hub 18. When key 60 is turned, hooks 64 grapple, or engage spokes 50. The turning motion of key 60 exerts force onto the spokes 50 that are in contact with the hooks 64 which causes hub 18 to turn in the same direction. In the exemplary embodiment, clockwise turning of key 60 locks hub 18 into core 38 whereas counter-clockwise turning of key 60 unlocks hub 18 from core 38. If the latter, then a pulling motion following the turning motion lifts hub 18 from core 38 due to the hooks 64 exerting a pull on the spokes 50. In alternative embodiments, the direction of turning for key 60 may be counter-clockwise for locking and clockwise for unlocking hub 18 from core 38. In other embodiments, hub 18 may be locked by key 60 via a pushing motion instead the aforementioned turning motion. In other embodiments, hub 18 may be unlocked by key 60 via a pure pulling motion instead of the aforementioned turning plus pulling motion.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A skateboard comprising:
   a deck having an underside surface, a longitudinal axis, and a latitudinal axis;
   one or more trucks coupled to the underside surface of the deck along the longitudinal axis of the deck;
   one or more wheels coupled to each of the one or more trucks along the latitudinal axis of the deck;
   a core coupled to each of the one or more wheels, said core formed of two adjacent cylinders including a first cylinder having a predetermined first diameter and a second cylinder having a predetermined second diameter, said first predetermined diameter greater than said second predetermined diameter, said first cylinder having a receiving portion disposed therein and said second cylinder having one or more fins disposed thereon;
   a key having two arms and a hook disposed on each of said arms; and
   a hub having a plurality of spokes, the hub removably attached to the core at the receiving portion of the core, and adapted to detach from the core upon engagement of the spokes by the arms of the key and rotation of the key relative to the core.

* * * * *